US011394069B2

United States Patent
Magnes et al.

(10) Patent No.: US 11,394,069 B2
(45) Date of Patent: *Jul. 19, 2022

(54) ADDITIVES FOR A FLOW BATTERY

(71) Applicant: BROMINE COMPOUNDS LTD., Beer Sheva (IL)

(72) Inventors: Ben-Zion Magnes, Meitar (IL); Neta Cohen, Lehavim (IL); Iris Ben-David, Ashdod (IL); Ronny Costi, Gedera (IL)

(73) Assignee: BROMINE COMPOUNDS LTD., Beer Sheva (IL)

( * ) Notice: Subject to any disclaimer, the term of this patent is extended or adjusted under 35 U.S.C. 154(b) by 395 days.

This patent is subject to a terminal disclaimer.

(21) Appl. No.: 15/773,670

(22) PCT Filed: Nov. 7, 2016

(86) PCT No.: PCT/IL2016/051203
§ 371 (c)(1),
(2) Date: May 4, 2018

(87) PCT Pub. No.: WO2017/081678
PCT Pub. Date: May 18, 2017

(65) Prior Publication Data
US 2018/0323484 A1 Nov. 8, 2018

Related U.S. Application Data

(60) Provisional application No. 62/253,152, filed on Nov. 10, 2015.

(51) Int. Cl.
*H01M 12/08* (2006.01)
*H01M 8/18* (2006.01)
(Continued)

(52) U.S. Cl.
CPC .......... *H01M 12/085* (2013.01); *H01M 4/86* (2013.01); *H01M 8/188* (2013.01);
(Continued)

(58) Field of Classification Search
None
See application file for complete search history.

(56) References Cited

U.S. PATENT DOCUMENTS 4,064,324 A   12/1977  Eustace
4,065,601 A   12/1977  Ajami et al.
(Continued)

FOREIGN PATENT DOCUMENTS

GB    2 005 064     4/1979
WO    2013/042103   3/2013
(Continued)

OTHER PUBLICATIONS

International Search Report for PCT/IL2016/051203, dated Jan. 30, 2017, 4 pages.
(Continued)

Primary Examiner — Zhongqing Wei
(74) Attorney, Agent, or Firm — Nixon & Vanderhye PC

(57) ABSTRACT

The invention relates to an electrolyte solution suitable for use in a zinc-bromine battery, comprising zinc bromide and a mixture of at least two complexing agents selected from the group consisting of 1-$R^2$-2-methyl pyridinium bromide and 1-$R^3$-3-methyl pyridinium bromide salts, wherein each of $R^2$ and $R^3$ is independently an alkyl group having not less than five carbon atoms.

18 Claims, 4 Drawing Sheets

(51) Int. Cl.
*H01M 4/86* (2006.01)
*H01M 10/36* (2010.01)

(52) U.S. Cl.
CPC .. *H01M 10/365* (2013.01); *H01M 2300/0002* (2013.01); *Y02E 60/10* (2013.01)

(56) References Cited

U.S. PATENT DOCUMENTS

| | | | |
|---|---|---|---|
| 4,109,065 | A | 8/1978 | Will et al. |
| 4,147,840 | A | 4/1979 | Walsh et al. |
| 4,510,218 | A | 4/1985 | Ando et al. |
| 4,631,240 | A | 12/1986 | Walsh |
| 9,905,874 | B2 * | 2/2018 | Magnes ............... H01M 8/188 |
| 2015/0155584 | A1 * | 6/2015 | Magnes ............... H01M 8/20 |
| | | | 429/418 |
| 2015/0372351 | A1 * | 12/2015 | Magnes ............... H01M 8/188 |
| | | | 429/50 |

FOREIGN PATENT DOCUMENTS

| | | | |
|---|---|---|---|
| WO | 2013/042110 | 3/2013 | |
| WO | 2013/168145 | 11/2013 | |
| WO | 2014/122641 | 8/2014 | |
| WO | WO-2014122641 A1 * | 8/2014 | ............ H01M 8/188 |
| WO | 2016/181389 | 11/2016 | |

OTHER PUBLICATIONS

Written Opinion of the ISA for PCT/IL2016/051203, dated Jan. 30, 2017, 5 pages.
Cathro et al., "Selection of Quaternary Ammonium Bromides for Use in Zinc/Bromine Cells", Journal of Power Sources 18, 1986, pp. 349-370.
International Search Report issued in PCT/IL2016/050490 dated Aug. 17, 2016.
Written Opinion of the International Searching Authority issued in PCT/IL2016/050490 dated Aug. 17, 2016.

* cited by examiner

ADDITIVES FOR A FLOW BATTERY

This application is the U.S. national phase of International Application No. PCT/IL2016/051203 filed 7 Nov. 2016, which designated the U.S. and claims the benefit of U.S. Application No. 62/253,152 filed 10 Nov. 2015, the entire contents of each of which are hereby incorporated by reference.

The invention is concerned with additives useful in energy storage devices based on generation of elemental bromine, such as zinc-bromine batteries. The additives are bromine-complexing agents, i.e., they are added to the electrolyte solution circulating in the batteries to complex the bromine generated on charging the battery.

In its simplest configuration, a zinc-bromine cell contains two chemically non-reactive electrodes and a separator located between the electrodes (e.g., an ion exchange membrane or microporous plastic sheet). The electrolyte used in the cell is an aqueous solution of zinc bromide, which is generally fed to the two compartments of the cell from two separate external reservoirs, utilizing a suitable circulation system. The term "anode" is used herein to indicate the electrode where metal zinc is formed (during charge) and oxidized (during discharge). The term "cathode" is used herein to indicate the electrode where elemental bromine is generated (during charge) and reduced (during discharge).

During charge, an electric current is supplied to the cell from an external source, causing the deposition of zinc metal onto the anode and the concurrent generation of elemental bromine at the cathode, as shown by the following reaction:

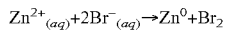

$$Zn^{2+}_{(aq)} + 2Br^{-}_{(aq)} \rightarrow Zn^0 + Br_2$$

The aqueous electrolyte solution which circulates through the cathodic side during the cell charge contains a complexing agent, which is capable of forming a water-immiscible liquid phase upon complexing with elemental bromine. Thus, the elemental bromine generated at the cathodic side during cell charge reacts almost instantaneously with the water-soluble complexing agent, to form a water immiscible oily phase. The dense bromine-containing oily phase tends to settle at the bottom of the reservoir used for holding the catholyte. In this way, bromine is produced and then stored in a reservoir outside the cell.

During discharge, the reverse chemical reaction takes place and an electric current is drawn from the cell. The bromine-containing liquid, which forms part of the catholyte, is brought to the cathodic side of the cell, while the anolyte is simultaneously circulated through the anodic side. This results in the dissolution of the zinc anode to give zinc ions and the reduction of elemental bromine to form bromide ions (and the generation of electrical current). The chemical reaction is represented by the following equation:

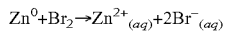

$$Zn^0 + Br_2 \rightarrow Zn^{2+}_{(aq)} + 2Br^{-}_{(aq)}$$

FIG. 1 provides a schematic illustration of an example of a typical, separator-containing zinc-bromine cell, wherein numerals 1a and 1c indicate the anode and cathode, respectively, and numeral 2 represents the separator positioned between the electrodes. A reservoir for accommodating an aqueous solution of zinc bromide, used as the anolyte, is indicated by numeral 3a. Similarly, a reservoir 3c contains the catholyte, which consists of two liquid phases: an upper, aqueous solution of zinc bromide and a lower, dense organic phase comprising the elemental bromine in a form of a complex. The flow paths allowing the circulation of the anolyte and catholyte are respectively indicated by arrows (the streams are driven by pumps Pa, Pc). A suitable valve (v) allows injection of bromine into the flow path of the catholyte on discharge only. A power source and a load are electrically connected to the electrodes (numerals 4 and 5, respectively).

The simple cell configuration illustrated in FIG. 1 consists of two monopolar electrodes; commercial versions of zinc-bromine batteries are provided in a bipolar configuration, i.e., in the form of a stack consisting of bipolar electrodes placed in series between a pair of monopolar terminal electrodes.

Another configuration of zinc-bromine batteries is based on a membraneless electrochemical cell, devoid of a physical barrier (i.e., a separator) in the reaction zone between the electrodes. By removing the separator, several advantages can be gained. First, the internal resistance for the movement of ions from one compartment to the other, developed due to the presence of a physical barrier, is eliminated. Second, in a membraneless electrochemical cell, one electrolyte storage tank and one pump for circulating said electrolyte are used, which is certainly cost effective in comparison with the operation of the common zinc-bromine flow cell illustrated in FIG. 1, where two electrolyte tanks and two pumps are necessary.

As mentioned above, a complexing agent is added to the electrolyte solution in zinc bromine cells to react with the elemental bromine generated. For example, additives are described in U.S. Pat. Nos. 4,065,601, 4,064,324, 4,631,240, GB 2005064 and in Cathro et al. [Journal of Power Sources 18, p. 349-370 (1986)]. In a series of recently published international publications (WO 2013/042110, WO 2013/168145 and WO 2014/122641) we reported the synthesis and properties of 1-alkyl-2-alkyl pyridinium bromide salts and 1-alkyl-3-alkyl pyridinium bromide salts as additives for different types of energy storage devices involving the generation of elemental bromine. Specifically, the preparation of 1-ethyl-2-methyl pyridinium bromide (abbreviated 2-MEPy) and its use in hydrogen/bromine cells and zinc-bromine membraneless cells is demonstrated in WO 2013/042110 and WO 2013/168145, respectively. 1-alkyl-3-alkyl pyridinium bromide salts, especially 1-n-butyl-3-methyl pyridinium bromide (abbreviated 3-MBPy), were shown to be effective bromine-complexing agents in zinc/bromine flow batteries (WO 2014/122641). In co-pending, co-assigned PCT/IL2016/050490, it is reported that 1-n-butyl-2-methyl pyridinium bromide (abbreviated 2-MBPy) is an effective additive at high operating temperature.

As shown below, properties considered important for screening potential bromine-complexing agents for zinc-bromine batteries include stability against solidification/crystallization down to low ambient temperatures (as low as 0° C. and even −5° C.); low viscosity of the complex-containing oily phase, to allow an efficient transport of bromine between the aqueous electrolyte and the oily complex phase; high conductivity of the electrolyte solution and an ability to maintain an acceptable amount of bromine dissolved in the aqueous phase. Hereinafter the term 'free bromine' is sometimes used to indicate the bromine dissolved in the aqueous electrolyte.

The acceptable 'free bromine' concentration range is in fact very narrow. On the one hand, there is an upper limit to the concentration range, due to the fact that the amount of 'free bromine' in the negative side of the cell must be as low as possible, to minimize the occurrence of the non-faradaic reaction (unfortunately, no separator can totally prevent bromine migration to the anode side; in the membraneless cell configuration, the requirement placed on the amount of 'free bromine' is more stringent). On the other hand, there is a lower limit of 'free bromine' concentration range, which arises from the need to maintain transport of bromine to the positive electrode during discharge.

The temperature encountered during the operation of zinc-bromine battery may sometimes be up to 55-60° C. We investigated the effect of temperature on the complexation ability towards bromine of the 1-alkyl-2-methyl pyridinium bromide salts and 1-alkyl-3-methyl pyridinium bromide salts, and found that the complexation ability generally decreases with increasing temperature, meaning that the concentration of the 'free bromine' in the aqueous electrolyte increases with increasing temperature. However, experimental work conducted in support of this invention shows that on combining together two or more 1-alkyl-2-methyl pyridinium bromide salts and 1-alkyl-3-methyl pyridinium bromide salts, mixtures are formed which are especially effective in keeping the aqueous phase bromine concentration low at the high temperature operation range. Mixtures demonstrating the desired behavior at elevated temperatures comprise two or more compounds selected from the group consisting of 1-alkyl-2-methyl pyridinium bromide salts and 1-alkyl-3-methyl pyridinium bromide salts, characterized in that the alkyl groups attached to the nitrogen atom in the 2-methyl pyridine and 3-methyl pyridine rings consist of not less than five carbon atoms (these alkyl groups are designated herein $R^2$ and $R^3$, respectively).

It should be noted that the two (or more) components of the mixture of the invention may be all selected from the class of 1-$R^2$-2-methyl pyridinium bromide salts. In an alternative embodiment, the two (or more) components of the mixture are selected from the class of 1-$R^3$-3-methyl pyridinium bromide salts. In another alternative embodiment, the mixture of the invention comprises at least one 1-$R^2$-2-methyl pyridinium bromide salt and at least one 1-$R^3$-3-methyl pyridinium bromide salt.

According to one embodiment of the invention, the mixtures are binary mixtures, with the weight ratio between the two components of the mixture being in the range from 1:20 to 20:1, preferably from 1:5 to 5:1, more preferably from 1:3 to 3:1. Preferred are equally proportioned mixtures; as used herein, the term "equally proportioned mixtures" encompasses 1:1.5 to 1.5:1 mixtures. Ternary or higher order mixtures comprising three or (more) compounds, all selected from the group consisting of 1-$R^2$-2-methyl pyridinium bromide salts and 1-$R^3$-3-methyl pyridinium bromide salts can also be used.

It should be understood that the mixtures of the invention may include, in addition to 1-$R^2$-2-methyl pyridinium bromide salts and 1-$R^3$-3-methyl pyridinium bromide salts, one or more auxiliary bromine-complexing agents, i.e., a halide (preferably bromide) salt which forms complex upon contact with elemental bromine. Thus, the auxiliary bromine-complexing agents are different from 1-$R^2$-2-methyl pyridinium bromide and 1-$R^3$-3-methyl pyridinium bromide salts. Suitable auxiliary bromine-complexing agents are preferably selected from the group of tetraalkyl ammonium salts, with halide, e.g., bromide, as the counter anion. Symmetrical and unsymmetrical tetraalkyl ammonium salts can be used; for example, symmetrical salts such as tetraethyl ammonium bromide and tetrabutylammonium bromide (abbreviated herein TEA and TBA, respectively).

To form the mixtures of the invention, 1-$R^2$-2-methyl pyridinium bromide salts and 1-$R^3$-3-methyl pyridinium bromide salts are chosen such that $R^2$ and $R^3$ are preferably independently selected from C5, C7 and C8 normal (straight-chain) and branched alkyl groups. Mixtures comprising at least one 1-substituted pentyl salts (i.e., wherein at least one of $R^2$ and $R^3$ is C5 alkyl group; that is, pentyl) have emerged from the studies reported below as especially useful additives, on account of their ability to keep the aqueous phase bromine concentration particularly low at elevated temperatures. By the term "pentyl" all possible C5 isomers are intended; especially preferred are n-pentyl [(—CH$_2$)$_4$—CH$_3$] and isopentyl [(—(CH$_2$)$_2$—CH—(CH$_3$)$_2$].

In general, the goal of maintaining a minimal amount of 'free bromine' in the aqueous phase at elevated temperatures can be achieved with the aid of binary and ternary mixtures. The descriptive terms "binary", "ternary" and the like are assigned to the mixtures according to the total number of bromine complexing agents specifically listed in the mixture, i.e., 1-$R^2$-2-methyl pyridinium bromide salts, 1-$R^3$-3-methyl pyridinium bromide salts and any other auxiliary bromide salt present. It should be understood, however, that the terms "binary" and "ternary" are used for the purpose of simplicity and are not meant to define compositions consisting only of two or three components. Some preferred mixtures of the invention are now described in more detail.

Binary mixtures which are suitable for use consist of one 1-$R^2$-2-methyl pyridinium bromide salt and one 1-$R^3$-3-methyl pyridinium bromide salt, wherein each of $R^2$ and $R^3$ is pentyl group (these pentyl groups may be the same or different, for example, $R^2$ and $R^3$ can be both n-pentyl, or $R^2$ and $R^3$ can be n-pentyl and isopentyl, respectively). Especially preferred is an equally proportioned mixture of 1-n-pentyl-2-methyl pyridinium bromide (2-MPePy) and 1-n-pentyl-3-methyl pyridinium bromide (3-MPePy), and an equally proportioned mixture of 1-n-pentyl-2-methyl pyridinium bromide (2-MPePy) and 1-isopentyl-3-methyl pyridinium bromide (3-MiPePy). These mixtures are sometimes abbreviated herein BCAm10 and BCAm9, respectively.

It is also possible to form suitable binary mixtures by combining together two bromine complexing agents belonging to the same class, e.g., two different compounds of the 1-$R^3$-3-methyl pyridinium bromide series. Preferably, the different $R^3$ substituents are selected from the group consisting of C5 isomers. More specifically, an equally proportioned mixture of 1-n-pentyl-3-methyl pyridinium bromide (3-MPePy) and 1-isopentyl-3-methyl pyridinium bromide (3-MiPePy) can be used. This mixture is sometimes abbreviated herein BCAm3.

The preferred ternary mixtures suitable for use according to the invention comprise 1-$R^2$-2-methyl pyridinium bromide (for example, where $R^2$ is pentyl), 1-$R^3$-3-methyl pyridinium bromide (for example, where $R^3$ is C7-C8 straight or branched alkyl, such as isooctyl) and a tetraalkyl ammonium halide salt. Ternary mixtures comprising a first 1-$R^3$-3-methyl pyridinium bromide, a second 1-$R^3$-3-methyl pyridinium bromide and tetraalkyl ammonium halide are also contemplated by the invention, especially with a first $R^3$ being C5 straight or branched alkyl and a second $R^3$ being C7-C8 straight or branched alkyl.

The ternary mixtures are preferably equally proportioned with respect to the 1-$R^2$-2-methyl pyridinium bromide and 1-$R^3$-3-methyl pyridinium bromide salts; the tetraalkyl ammonium salt, on the other hand, constitutes a minor component of the ternary mixture. For example, the mixture is proportioned 1-3:3-1:0.1-0.2, more specifically 1.00-1.5: 1.5-1.00:0.05-0.15 (corresponding to 1-$R^2$-2-methyl pyridinium bromide: 1-$R^3$-3-methyl pyridinium bromide:tetraalkyl ammonium bromide). The same ratios also apply for the other type of the ternary mixtures mentioned above, comprising a first 1-$R^3$-3-methyl pyridinium bromide, a second 1-$R^3$-3-methyl pyridinium bromide and tetraalkyl ammonium halide.

Accordingly, one aspect of the invention relates to an electrolyte solution suitable for use in a zinc-bromine battery, comprising zinc bromide and a mixture of at least two complexing agents selected from the group consisting of 1-$R^2$-2-methyl pyridinium bromide and 1-$R^3$-3-methyl pyridinium bromide salts, wherein $R^2$ and $R^3$ are previously defined, wherein said bromide salts form complexes with elemental bromine.

Another aspect of the invention is the use of a mixture comprising at least two complexing agents selected from the group consisting of 1-$R^2$-2-methyl pyridinium bromide and 1-$R^3$-3-methyl pyridinium bromide salts, wherein $R^2$ and $R^3$ are as previously defined, as an additive in the electrolyte solution of zinc bromine flow cells operating at a temperature above 35° C., e.g., above 40° C. and also above 45°.

In yet another aspect, the invention is directed to a method of operating a zinc-bromine battery, comprising adding to the electrolyte of said battery a mixture of at least two complexing agents selected from the group consisting of 1-$R^2$-2-methyl pyridinium bromide and 1-$R^3$-3-methyl pyridinium bromide salts, wherein $R^2$ and $R^3$ are as previously defined, and charging or discharging said cell at a temperature above 35° C., e.g., above 40° C. and also above 45°.

The preferred mixtures of 1-$R^2$-2-methyl pyridinium bromide and 1-$R^3$-3-methyl pyridinium bromide salts to be added to the zinc/bromine battery electrolyte are characterized in that $R^2$ and $R^3$ are independently selected from the group consisting of C5, C7 and C8 normal and branched alkyl groups. More preferably at least one of $R^2$ and $R^3$ is C5 alkyl group. In some embodiments of the invention, each of $R^2$ and $R^3$ is C5 alkyl group (which may be the same or different). Electrolyte containing mixtures of two complexing agents selected from the group consisting of 1-$R^2$-2-methyl pyridinium bromide and 1-$R^3$-3-methyl pyridinium bromide salts, wherein the molar ratio between the components of the mixture is in the range from 1:5 to 5:1 (e.g., from 1:3 to 3:1, or from 1:1.5 to 1.5:1), are preferred.

As noted above, the most preferred mixtures include:

a) 1-n-pentyl-2-methyl pyridinium bromide and 1-n-pentyl-3-methyl pyridinium bromide;

1-n-pentyl-2-methyl pyridinium bromide and 1-isopentyl-3-methyl pyridinium bromide;

1-n-pentyl-3-methyl pyridinium bromide and 1-isopentyl-3-methyl pyridinium bromide;

1-n-pentyl-2-methyl pyridinium bromide, 1-iso-octyl-3-methyl pyridinium bromide and tetraethyl ammonium bromide; and 1-n-pentyl-3-methyl pyridinium bromide, 1-iso-octyl-3-methyl pyridinium bromide and tetrabutyl ammonium bromide.

1-$R^2$-2-methyl pyridinium bromide and 1-$R^3$-3-methyl pyridinium bromide salts are commercially available or can be prepared by methods known in the art. Some useful synthetic methods are illustrated in the co-assigned international publications mentioned above. In its most general form, the syntheses are accomplished by reacting 2-picoline or 3-picoline with the corresponding bromoalkane; this synthetic method is illustrated below for the preparation of 1-$R^3$-3-methyl pyridinium bromide salts:

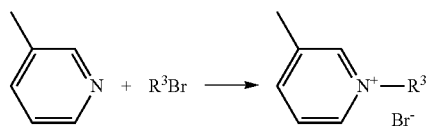

where $R^3Br$ indicates the bromoalkane which participates in the reaction, namely, $R^3$ is a normal (straight-chain) or branched alkyl group as previously defined. The reaction can be carried out in the absence of a solvent. For example, a reaction vessel is charged with 3-picoline and heated to a temperature of not less than 70° C., following which the bromoalkane $R^3Br$ is fed to the reaction vessel, preferably by gradual addition. Bromoalkanes are generally liquids at room temperature, and can be easily fed to the reaction vessel. On completion of the addition of the bromoalkane $R^3Br$, the reaction mixture is maintained under heating for an additional period of time. There is no need to recover the 1-$R^3$-3-methyl pyridinium bromide salt in a solid form. Rather, at the end of the reaction, deionized water is added, followed by distillation to remove unreacted reactants; this cycle, consisting of deionized water addition and volatiles removal, can be repeated several times until finally deionized water is added to the reaction mass, which consists essentially of the 1-$R^3$-3-methyl pyridinium bromide in a liquid state, to afford the desired concentrated aqueous solution of the 1-$R^3$-3-methyl pyridinium bromide salt. It should be noted that two different bromalkanes can be fed simultaneously or consecutively to a reaction vessel which was previously charged with 3-picoline, to directly form an aqueous concentrate comprising a mixture consisting of a pair of bromine complexing agents.

It should be noted that the aqueous solutions obtained through the solvent-free reactions set forth above, where the isolation of the product in a solid form is intentionally avoided, contain the bromide salts at a concentration in the range from 60 to 92 wt %. When a small amount of elemental bromine is added to these solutions, the separation of an oily phase takes place, due to the complex-formation reaction. These solutions can therefore be used as bromine carriers, to safely transport elemental bromine to the manufacturers of $Zn/Br_2$ batteries. A small amount of elemental bromine is conventionally added to the electrolyte solution before initiating battery charging, to minimize overpotential, and this amount of elemental bromine can be supplied with the aid of the complexing agents-containing aqueous solutions.

Other synthetic methods, based on a reaction of 2-picoline or 3-picoline with the bromoalkane in a suitable solvent (e.g., acetonitrile) under reflux, can also be employed, to recover the individual 1-$R^2$-2-methyl pyridinium bromide and 1-$R^3$-3-methyl pyridinium bromide salts in a solid form, followed by purifying same, e.g., by recrystallization.

When put to use in zinc/bromine batteries, the mixtures according to the invention are added to the zinc bromide solution in any convenient way, e.g., by successively or simultaneously adding the individual components to the electrolyte solution (either in a solid form, or by separately dissolving the salts in water or in a suitable solution, following which the so-formed aqueous solutions are injected into the electrolyte solution; or by feeding the aqueous solutions obtained from the aforementioned solvent-free synthesis). Alternatively, the solid individual components are premixed to form a blend, which is then added—either in a solid or solution form—to the electrolyte solution.

Regarding the electrolyte solution, a suitable aqueous zinc bromide electrolyte solution which may be used in zinc bromine batteries has the following composition: $ZnBr_2$ at a concentration from 0.5M to 5.0 M, (preferably 1.0 to 3.0 M, e.g., from 2.0 to 3.0 M); a complexing agent at a concentration of not less than 0.25M, e.g., from 0.25 M-2.5 M, and optionally, one or more water soluble salts such as halide salts, e.g., zinc chloride, sodium chloride or potassium chloride, and also sulfate salts (these salts serve as conductivity enhancers). The total concentration of the secondary water-soluble salts, which may optionally be present in the electrolyte solution, can be up to 3.5 M, e.g., between 0.5-3.5 M. It is noted that due the reasons set forth above, the electrolyte solution may further contain added bromine or in-situ chemically generated bromine, as described in WO 2013/042103, and also the electrochemically generated bromine (which is formed in-situ in the cell on charging). On charging, the zinc bromide is consumed and bromine is generated. On discharging, the aqueous phase of the electrolyte is again concentrated with respect to $ZnBr_2$, and the concentration of elemental bromine is decreased.

Structures of zinc/bromine batteries which can employ the electrolyte of the invention are known in the art and are described, for example, in U.S. Pat. Nos. 4,109,065, 4,510,218 and WO 2013/042103.

In the drawings:

FIG. 1 provides a schematic illustration of a zinc/bromine cell.

EXAMPLES

Examples 1-5

Properties of Zinc Bromide Electrolyte Solutions at Elevated

Temperature (55° C.) in the Presence of Additives of the Invention

To test the utility of different mixtures of bromine-complexing agents (BCA) in zinc-bromine batteries, 100 ml samples of zinc bromide electrolyte solutions were prepared, with varying amounts of zinc bromide and elemental bromine as tabulated in Table 1, to match different states of charge. Each sample contains, in addition to the aqueous solution of zinc bromide, elemental bromine and the BCA mixture at concentrations tabulated below, also zinc chloride at a concentration of ~0.4M. The samples were stored under stirring at 55° C. for 24-48 hours after preparation before any measurement was conducted.

The following properties of interest were measured at 55° C.:

(i) the bromine concentration in the aqueous phase was determined by a conventional iodometric titration technique. Each vial was sampled two times.

(ii) the viscosity of the complex containing-oily phase was measured using Cannon-Fenske Opaque Viscometer.

(iii) the conductivity was measured using InoLab 740 conductivity meter with TetraCon 325 standard conductivity cell.

The foregoing properties were measured for mixtures of additives under consideration at different compositions of the electrolyte solution, matching different states of charge (the end points and the midpoint of the SOC scale were investigated, i.e., three compositions corresponding to 0%, 50% and 100% SOC). The results are set out in Table 1.

TABLE 1

| Ex. | BCA [1M total] | % SOC | [$ZnBr_2$] M | [$Br_2$] M | [Free $Br_2$] in the aqueous phase (M) | Viscosity Of organic phase (cP) | Conductivity (mS/cm) |
|---|---|---|---|---|---|---|---|
| 1A | 3-MPePy + | 0 | 1.6 | 0.5 | 0.0057 | 38 | 149 |
| 1B | 3-MiPePy | 50 | 0.9 | 1.1 | 0.0090 | 28 | 150 |
| 1C | (1:1) BCAm3* | 100 | 0.2 | 1.7 | 0.0195 | 17 | 130 |
| 2A | 2-MPePy + | 0 | 1.6 | 0.5 | 0.0034 | 33 | 154 |
| 2B | 3-MiPePy | 50 | 0.9 | 1.1 | 0.0062 | 19 | 158 |
| 2C | (1:1) BCAm9* | 100 | 0.2 | 1.7 | 0.0144 | 12 | 133 |
| 3A | 2-MPePy + | 0 | 1.6 | 0.5 | 0.0038 | 31 | 153 |
| 3B | 3-MPePy | 50 | 0.9 | 1.1 | 0.0070 | 14 | 157 |
| 3C | (1:1) BCAm10* | 100 | 0.2 | 1.7 | 0.0147 | 12 | 136 |
| 4A | 2-MPePy + | 0 | 1.6 | 0.5 | 0.0050 | 91 | 149 |
| 4B | 3-MiOPy + | 50 | 0.9 | 1.1 | 0.0070 | 41 | 152 |
| 4C | TEA (1:1:0.2) BCAm13* | 100 | 0.2 | 1.7 | 0.0092 | 17 | 139 |
| 5A | 3-MPePy + | 0 | 1.6 | 0.5 | 0.0017 | 28 | 137 |
| 5B | 3-MiOPy + | 50 | 0.9 | 1.1 | 0.0046 | ND | 157 |
| 5C | TBP (1:1:0.2) BCAm14* | 100 | 0.2 | 1.7 | 0.0067 | ND | 141 |

Figure 1:
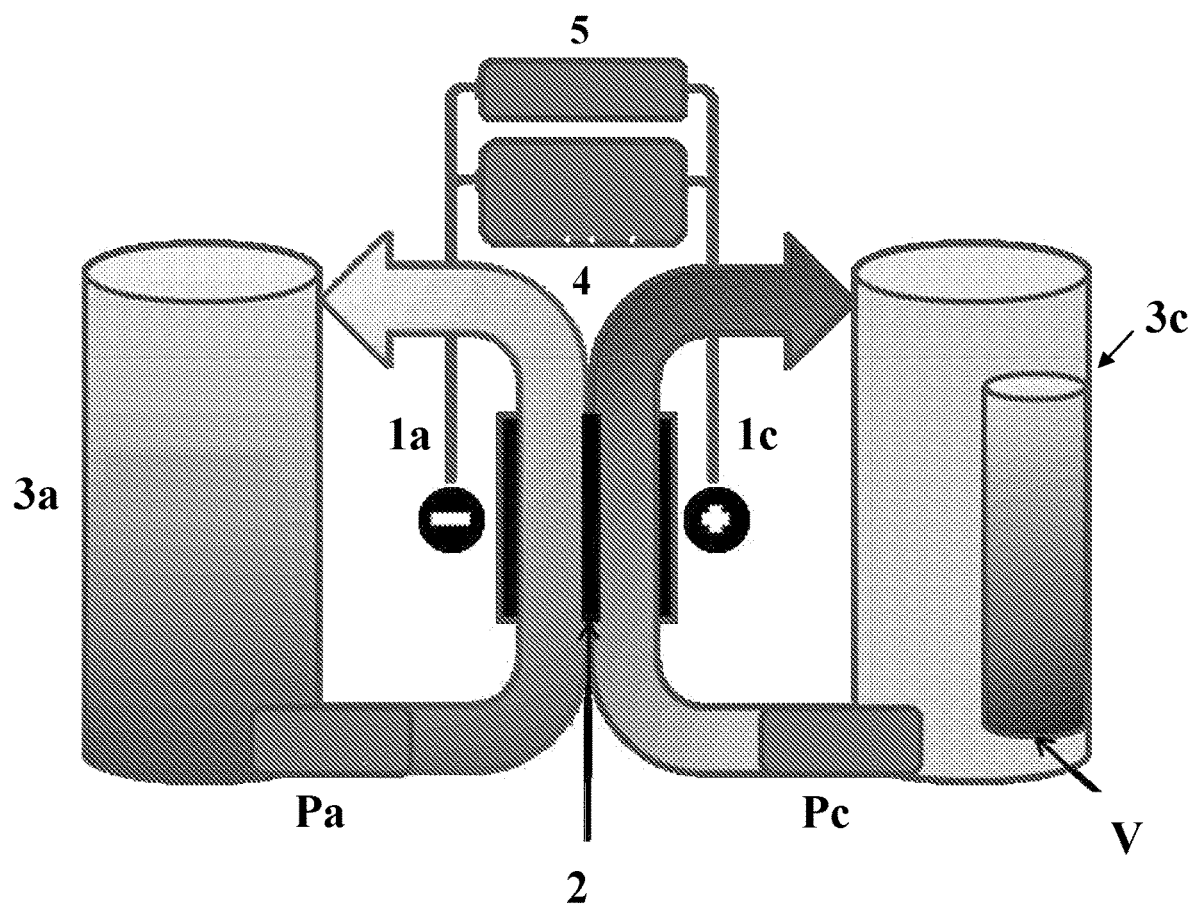
Figure 2:
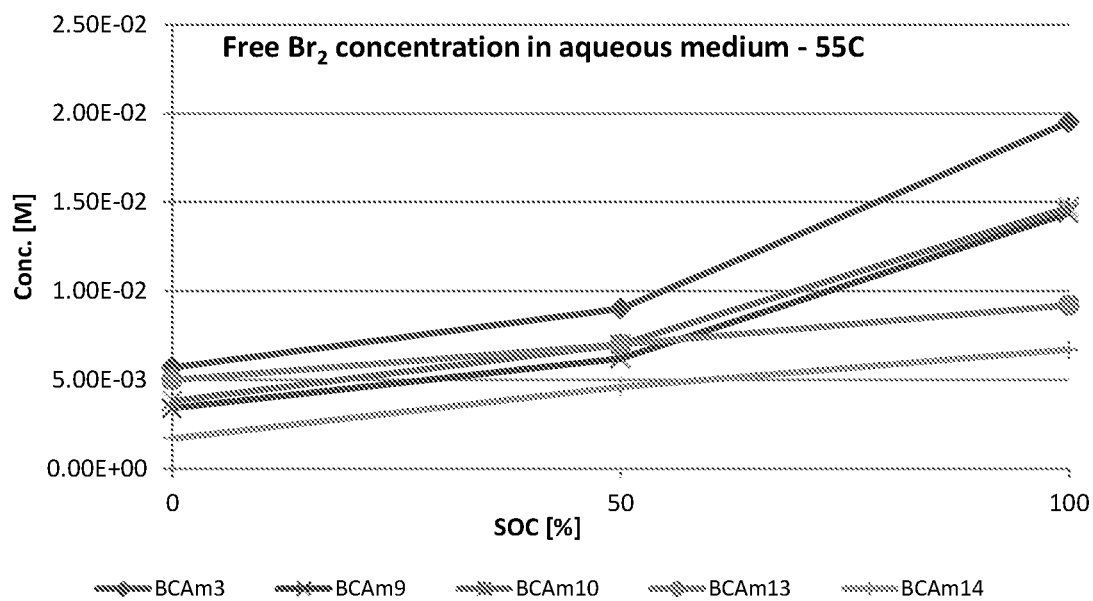
FIG. 2 is a graph showing the concentration of elemental bromine dissolved in the aqueous phase in the electrolyte solution at 55° C. in the presence of the tested additive mixture, against the state of charge (SOC).
Figure 3:
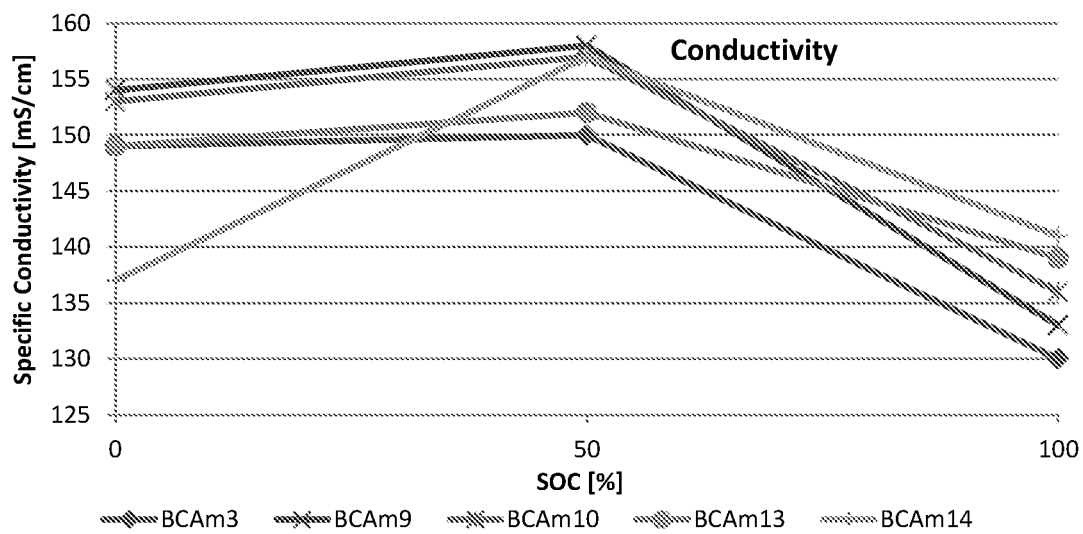
FIG. 3 shows conductivity versus SOC curves for the additive mixtures of the invention.

Some results are also shown graphically in FIGS. 2 and 3.

The concentration of bromine dissolved in the aqueous phase at 55° C. in the presence of the tested additive mixture is plotted in FIG. 2. The abscissa indicates the composition of the electrolyte solutions, which correspond to the 0%, 50% and 100% states of charge, as set forth above. The results show that the tested mixtures display high complexing ability towards elemental bromine at high temperature, keeping the concentration of free bromine in the electrolyte solution low at 55° C.

The concentration of the additive in the aqueous phase is low; this in turn leads to high conductivity of the solution (or lower resistance), as seen in the conductivity versus SOC curves which are plotted in the graph of FIG. 3.

Example 6

Figure 4:
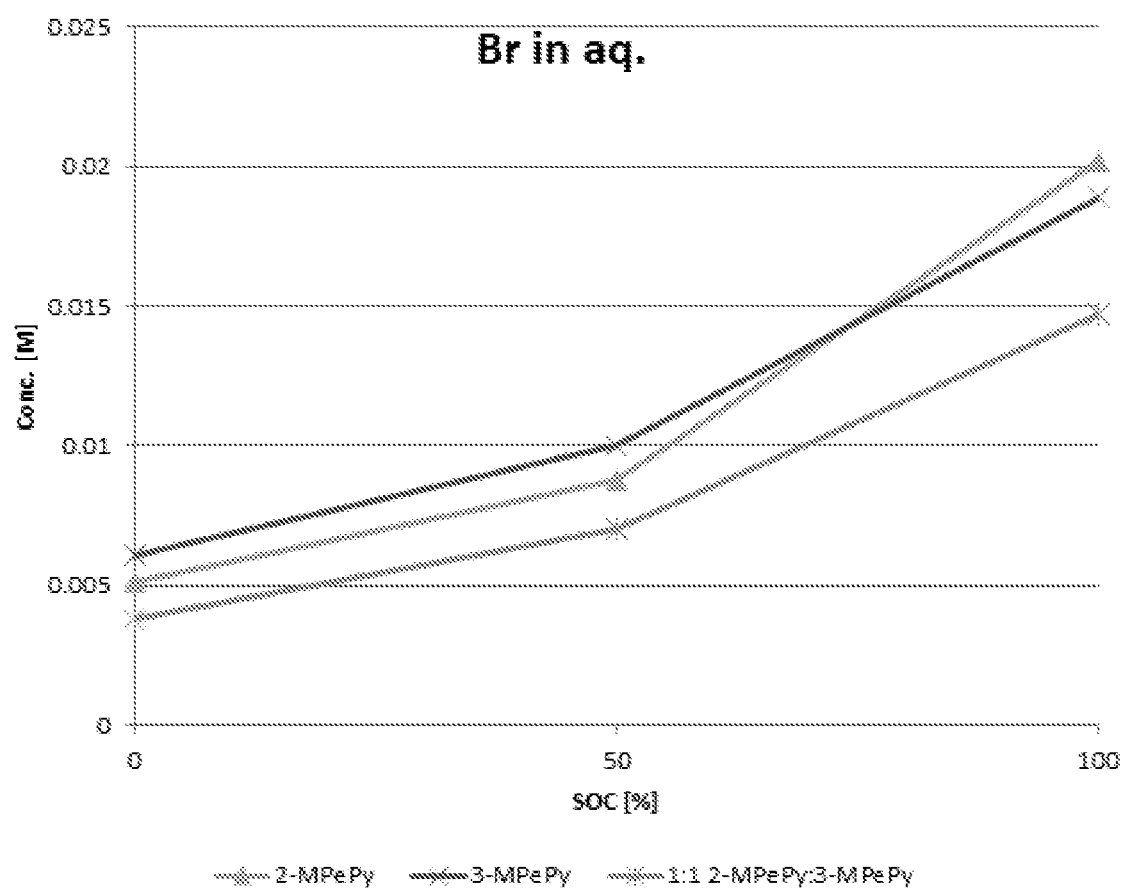
FIG. 4 is a graph showing the concentration of elemental bromine dissolved in the aqueous phase in the electrolyte solution at 55° C. in the presence of one preferred additive mixture (BCAm10), against the SOC. Results are also shown for the individual components.

To illustrate the advantage of a mixture of complexing agents over its separate components, the experimental procedure set forth above was used to produce the results shown in FIG. 4.

The concentration of bromine dissolved in the aqueous electrolyte at 55° C. in the presence of the additive of Example 3 is plotted in FIG. 4. The additive is a mixture consisting of 1-n-pentyl-2-methyl pyridinium bromide and 1-n-pentyl-3-methyl pyridinium bromide (1:1). The abscissa indicates the compositions of the electrolyte solutions tested, which correspond to the 0%, 50% and 100% state of charge, as set forth above (therefore the curve represents the same information as in Table 3 for the mixture named "BCAm10"). The concentration of bromine dissolved in the aqueous electrolyte at 55° C. in the presence of each of the individual components is also plotted (the curves which correspond to 1-n-pentyl-2-methyl pyridinium bromide and 1-n-pentyl-3-methyl pyridinium bromide are marked with triangles and "X", respectively). The results indicate that the mixture is more effective than the individual components in keeping the aqueous phase bromine concentration low at 55° C.

Example 7

1-iso-pentyl-3-methyl-pyridinium bromide, one of the components of the mixtures "BCAm3" and "BCAm9" tested in Examples 1 and 2, respectively, produces a thick gel or a solid phase when incorporated as a single additive into a zinc bromide electrolyte solution at high temperature. On the other hand, a mixture of 1-iso-pentyl-3-methyl-pyridinium bromide with either 1-n-pentyl-3-methyl pyridinium bromide (Example 1) or with 1-n-pentyl-2-methyl pyridinium bromide (Example 2), gives good results in that no solids are formed in the electrolyte solution and the concentration of the aqueous bromine is fairly low at a temperature of 55° C.

Figure 5:
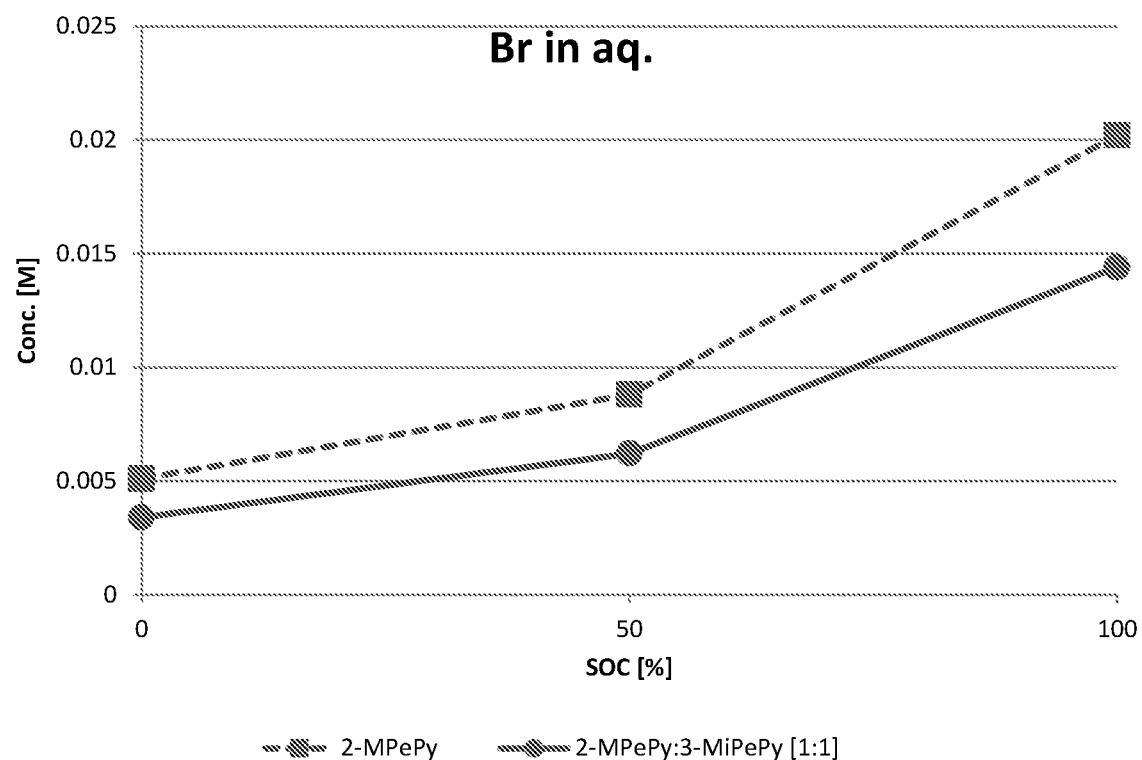
FIG. 5 is a graph showing the concentration of elemental bromine dissolved in the aqueous phase in the electrolyte solution at 55° C. in the presence of one preferred additive mixture (BCAm9), against the SOC. Results are also shown for one of the components.

In the graph of FIG. 5, which refers to the mixture named BCAm9, the abscissa indicates the composition of the electrolyte solutions tested corresponding to three different states of charge: discharged, half charge and full charge (therefore the curve marked with circles represents the same information as in Table 3 for the mixture BCAm9). In addition, the concentration of bromine dissolved in the aqueous electrolyte at 55° C. in the presence of a single compound, that is, 1-n-pentyl-2-methyl pyridinium bromide (marked with squares) is also plotted against the state of charge.

The results indicate that the mixture is more effective than its individual components in keeping the aqueous phase bromine concentration low at 55° C. (as explained above, the second component of the mixture, i.e., 1-iso-pentyl-3-methyl-pyridinium bromide, solidifies under the experimental conditions).

Preparation 1

Preparation of 1-n-pentyl-3-methyl-pyridinium bromide

3-MPePy

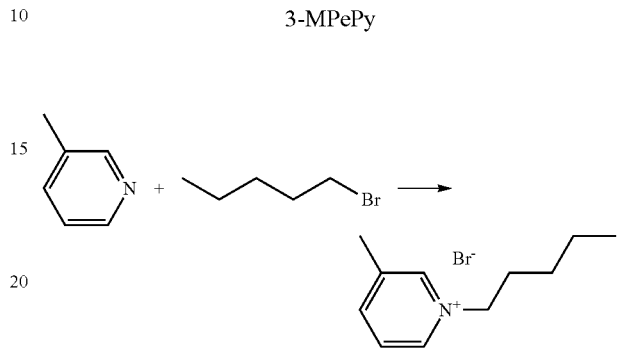

A double surface reactor (1 L) was equipped with a mechanical stirrer, a condenser, a thermocouple well and a dropping funnel. The reactor was purged with nitrogen during the whole procedure. The reactor was charged with 3-picoline (370.5 g) and heated to 80° C. 1-Bromopentane (610 g) was added drop-wise during 2 hours. The reaction mixture was heated at 82-84° C. for 2.5 hours. DIW (500 mL) was added; the mixture was cooled and the volatiles were evaporated (rotavapor). Another 500 mL DIW was added and the mixture was re-evaporated. Finally, the mixture was diluted with small volume of DIW. Final product, 1115 g, 82.7 weight % (argentometric titration); yield, 95%.

Preparation 2

Preparation of 1-iso-octyl-3-methyl-pyridinium bromide

3-MiOPy

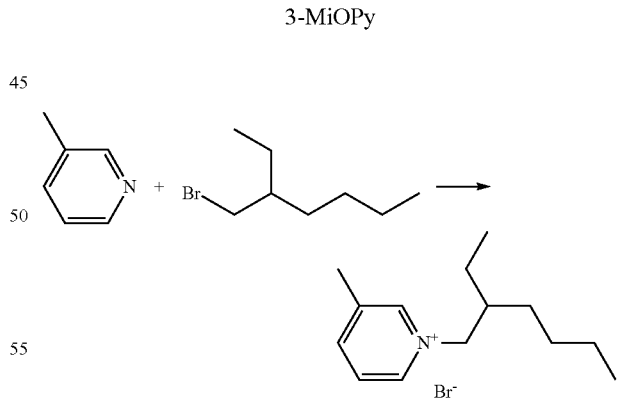

A double surface reactor (1 L) was equipped with a mechanical stirrer, a condenser, a thermocouple well and a dropping funnel. The reactor was purged with nitrogen during the whole procedure. The reactor was charged with 3-picoline (237 g) and heated to 80° C. 3-(Bromomethyl) heptane (500 g) was added drop-wise during 1.5 hours. The reaction mixture was heated at 100-105° C. for 26 hours. DIW (300 mL) was added; the mixture was cooled and the volatiles were evaporated (rotavapor, 325 g distillate).

Another 300 mL DIW was added and the mixture was re-evaporated (450 g distillate). Finally, the mixture was diluted with small volume of DIW. Final product, 864 g, 65 weight % (argentometric titration); yield, 77%.

Preparation 3

Preparation of 1-iso-pentyl-3-methyl-pyridinium bromide

3-MiPePy

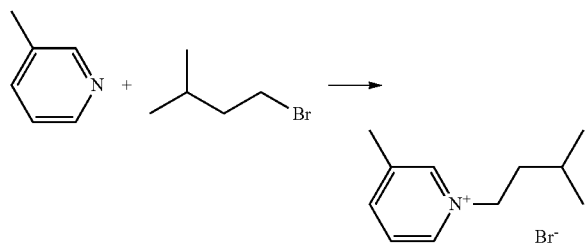

A double surface reactor (1 L) was equipped with a mechanical stirrer, a condenser, a thermocouple well and a dropping funnel. The reactor was charged with 3-picoline (364.5 g) and heated to 90° C. iso-Bromopentane (1-bromo-3-methylbutane, 600 g) was added drop-wise during 5 hours. The reaction mixture was heated at 90-99° C. for 2.5 hours. DIW (50 mL) was added; the mixture was cooled and the volatiles were evaporated (rotavapor). Additional DIW was added and the mixture was re-evaporated. Finally, the mixture was diluted with small volume of DIW. Final product, 1010 g, 91.6 weight % (argentometric titration); yield, 95.3%.

Preparation 4

Preparation of 1-pentyl-2-methyl-pyridinium bromide

2-MPePy

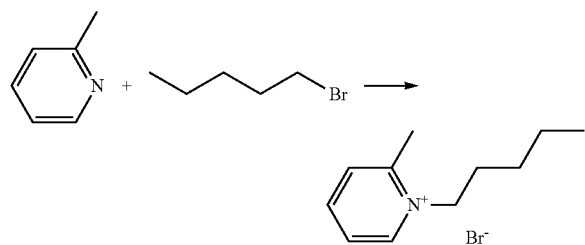

A double surface reactor (1 L) was equipped with a mechanical stirrer, a condenser, a thermocouple well and a dropping funnel. The reactor was charged with 2-picoline (303.7 g) and heated to 100° C. 1-Bromopentane (500 g) was added drop-wise during 6 hours. The reaction mixture was heated at 100-108° C. for 2.5 hours. DIW (100 mL) was added; the mixture was cooled and the volatiles were evaporated (rotavapor). Additional DIW was added and the mixture was re-evaporated. Finally, the mixture was diluted with small volume of DIW. Final product, 745 g, 90.8 weight % (argentometric titration); yield, 91.1%.

The invention claimed is:

1. An electrolyte solution suitable for use in a zinc-bromine battery, comprising zinc bromide and a mixture of at least two complexing agents selected from the group consisting of 1-$R^2$-2-methyl pyridinium bromide and 1-$R^3$-3-methyl pyridinium bromide salts, wherein each of $R^2$ and $R^3$ is independently an alkyl group having not less than five carbon atoms.

2. The electrolyte solution according to claim 1, wherein $R^2$ and $R^3$ are independently selected from the group consisting of C5, C7 and C8 straight-chain and branched alkyl groups.

3. The electrolyte solution according to claim 2, wherein at least one of $R^2$ and $R^3$ is C5 alkyl group.

4. The electrolyte solution according to claim 1, wherein the mixture comprises two complexing agents selected from the group consisting of 1-$R^2$-2-methyl pyridinium bromide and 1-$R^3$-3-methyl pyridinium bromide salts, wherein the molar ratio between the components of the mixture is in the range from 1:5 to 5:1.

5. The electrolyte solution according to claim 3, comprising 1-n-pentyl-2-methyl pyridinium bromide (2-MPePy) and 1-n-pentyl-3-methyl pyridinium bromide (3-MPePy).

6. The electrolyte solution according to claim 3, comprising 1-n-pentyl-2-methyl pyridinium bromide (2-MPePy) and 1-isopentyl-3-methyl pyridinium bromide (3-MiPePy).

7. The electrolyte solution according to claim 3, comprising 1-n-pentyl-3-methyl pyridinium bromide (3-MPePy) and 1-isopentyl-3-methyl pyridinium bromide (3-MiPePy).

8. The electrolyte solution according to claim 1, which further comprises tetraalkyl ammonium halide salt.

9. The electrolyte solution according to claim 8, comprising 1-$R^2$-2-methyl pyridinium bromide, 1-$R^3$-3-methyl pyridinium bromide and a tetraalkyl ammonium halide salt.

10. The electrolyte solution according to claim 9, wherein $R^2$ is C5 straight or branched alkyl; $R^3$ is C7-C8 straight or branched alkyl; and the tetraalkyl ammonium salt is selected from the group consisting of tetraethyl ammonium bromide and tetrabutyl ammonium bromide.

11. The electrolyte solution according to claim 10, comprising 1-n-pentyl-2-methyl pyridinium bromide, 1-iso-octyl-3-methyl pyridinium bromide and tetraethyl ammonium bromide.

12. The electrolyte solution according to claim 8, comprising a first 1-$R^3$-3-methyl pyridinium bromide, a second 1-$R^3$-3-methyl pyridinium bromide and a tetraalkyl ammonium salt.

13. The electrolyte solution according to claim 12, wherein the first $R^3$ is C5 straight or branched alkyl and the second $R^3$ is C7-C8 straight or branched alkyl.

14. The electrolyte solution according to claim 13, comprising 1-n-pentyl-3-methyl pyridinium bromide, 1-iso-octyl-3-methyl pyridinium bromide and tetrabutyl ammonium bromide.

15. A method of using a mixture comprising at least two complexing agents selected from the group consisting of 1-$R^2$-2-methyl pyridinium bromide and 1-$R^3$-3-methyl pyridinium bromide salts, wherein each of $R^2$ and $R^3$ is independently an alkyl group having not less than five carbon atoms, said method comprising adding the mixture as an additive to the electrolyte solution of zinc bromine flow cells operating at a temperature above 35° C.

16. The method according to claim 15, wherein $R^2$ and $R^3$ are independently selected from the group consisting of C5, C7 and C8 normal and branched alkyl groups.

17. A method of operating a zinc-bromine battery, comprising adding to the electrolyte of said battery a mixture of at least two complexing agents selected from the group consisting of 1-$R^2$-2-methyl pyridinium bromide and 1-$R^3$-3-methyl pyridinium bromide salts, wherein each of $R^2$ and $R^3$ is independently an alkyl group having not less than five carbon atoms, and charging or discharging said cell at a temperature above 35° C.

18. The method according to claim 17, wherein $R^2$ and $R^3$ are independently selected from the group consisting of C5, C7 and C8 normal and branched alkyl groups.

* * * * *